United States Patent
Yoshida (10) Patent No.: US 7,337,331 B2
(45) Date of Patent: Feb. 26, 2008

(54) DISTRIBUTIVE STORAGE CONTROLLER AND METHOD

(75) Inventor: Takeo Yoshida, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 825 days.

(21) Appl. No.: 10/379,735

(22) Filed: Mar. 6, 2003

(65) Prior Publication Data

US 2004/0049700 A1 Mar. 11, 2004

(30) Foreign Application Priority Data

Sep. 11, 2002 (JP) ............................. 2002-266137

(51) Int. Cl.
*G06F 11/30* (2006.01)
*G06F 12/00* (2006.01)
*G06F 9/26* (2006.01)
*H04L 9/00* (2006.01)

(52) U.S. Cl. ...................... 713/193; 711/162; 711/202; 713/153

(58) Field of Classification Search ............... 713/193, 713/153; 711/162, 202
See application file for complete search history.

(56) References Cited

U.S. PATENT DOCUMENTS

| 5,584,022 | A | * | 12/1996 | Kikuchi et al. ................. 707/9 |
|---|---|---|---|---|
| 6,006,318 | A | * | 12/1999 | Hansen et al. ................. 712/28 |
| 6,026,474 | A | * | 2/2000 | Carter et al. ................. 711/202 |
| 6,182,222 | B1 | * | 1/2001 | Oparaji ......................... 726/17 |
| 6,363,481 | B1 | * | 3/2002 | Hardjono ..................... 713/165 |
| 6,966,001 | B2 | * | 11/2005 | Obara et al. .................. 726/26 |
| 7,020,665 | B2 | * | 3/2006 | Douceur et al. ............ 707/200 |
| 7,136,903 | B1 | * | 11/2006 | Phillips et al. .............. 709/217 |
| 2002/0023219 | A1 | * | 2/2002 | Treffers et al. ............. 713/176 |
| 2002/0042859 | A1 | * | 4/2002 | Lowry ......................... 711/100 |
| 2002/0157016 | A1 | * | 10/2002 | Russell et al. .............. 713/200 |
| 2002/0161860 | A1 | * | 10/2002 | Godlin et al. ............... 709/219 |
| 2003/0046502 | A1 | * | 3/2003 | Okazaki ..................... 711/162 |
| 2003/0105830 | A1 | * | 6/2003 | Pham et al. ................. 709/216 |
| 2003/0172089 | A1 | * | 9/2003 | Douceur et al. ............ 707/200 |
| 2003/0188153 | A1 | * | 10/2003 | Demoff et al. .............. 713/153 |
| 2004/0010613 | A1 | * | 1/2004 | Apostolopoulos et al. .. 709/231 |

\* cited by examiner

*Primary Examiner*—Emmanuel L. Moise
*Assistant Examiner*—Techane J. Gergiso
(74) *Attorney, Agent, or Firm*—Oliff & Berridge, PLC (57) ABSTRACT

An inexpensive data storage technique utilizing available capacity in individual computer devices connected to a network is provided. When a backup client (BC) (14) of a user PC receives a backup instruction for a file from a user, the backup client (14) requests backup to a backup control server (20). The backup control server (20) divides and encrypts the file to be backed up into a plurality of encrypted pieces, transfers the encrypted pieces to user PCs (10), and stores the encrypted piece in the HDDs (12) of the user PCs (10). When the destributively backed up file is to be extracted, the user PC 10 obtains each encrypted piece from the user PCs 10 on which they are stored, and combines and decrypts the encrypted pieces to restore the original file.

22 Claims, 8 Drawing Sheets

DISTRIBUTIVE STORAGE CONTROLLER AND METHOD

BACKGROUND OF THE INVENTION

1. Field of the Invention

The present invention relates to a technique for storing data through a network.

2. Description of the Related Art

As computer technology has developed, the size of data handled by various applications has grown larger and larger. As a result, costly mass storage media, such as MO (magneto-optical) and CD-R/RW disks are required for backing up of data. In addition, a disk array system equipped with mirroring and error correction by RAID (Redundant Arrays of Independent Disks) is commonly used as a system for improving security of data to be stored, but this system also involves a significant cost.

On the other hand, tremendous increases in the capacity of hard disk drives (hereinafter referred to simply as "HDD") have been achieved in recent years, and even ordinary personal computers (hereinafter referred to simply as "PCs") now commonly come equipped with an HDD having a capacity of few tens of gigabytes (GB). However, these high capacity HDDs are rarely utilized to their maximum capacity, and, in general, a significant portion of the HDD capacity is substantially unused. Therefore, in large companies, for example, in which thousands or tens of thousands of PCs are connected to an internal network, a data storage capacity measured in terabytes remains idle and unused in the internal network.

The present invention was conceived in consideration of the above, and an advantage of the present invention is that a technique for inexpensively storing data using the available capacity of individual computer device connected to a network is provided.

SUMMARY OF THE INVENTION

According to one aspect of the present invention, there is provided a distributive storage controller for providing a data storage service to a plurality of computer devices connected to a network, the controller comprising a storage controller which, upon reception of a storage instruction of data from one of the computer devices, checks the status of storage devices in a plurality of computer devices, divides and encrypts the data into a plurality of encrypted pieces, selects, for each encrypted piece, a computer device to which the piece is to be stored from among the plurality of computer devices based on the result of the checking, transfers and stores the encrypted pieces to selected corresponding computer devices, and generates storage location information indicating which encrypted piece is stored in which computer device; and an extraction controller which, upon reception of an extraction instruction of data from one of the computer devices, identifies each computer device to which each of the encrypted pieces for the data is stored referring to the storage location information, obtains each encrypted piece from the corresponding computer device, restores the original data based on the encrypted pieces, and provides the restored data to the computer device instructing the extraction.

Here, "division and encryption" or "to divide and encrypt" refers to a process in which data is converted into a group of a plurality of pieces that are encrypted (encrypted pieces). The "division and encryption" or "to divide and encrypt" includes a process to first divide data into a plurality of pieces and then encrypting the pieces and a process to first encrypt data and then divide the encrypted data into a plurality of pieces. Both of these processes are referred to herein as "division and encryption".

According to this device, it is possible to achieve highly secure storage of data distributed into a storage device of each computer device.

According to another aspect of the present invention, it is preferable that, in the distributive storage controller, during the division and encryption, the storage controller removes a portion of each divided piece of data, generates the encrypted pieces from the segment remaining after the removal, and stores data of the fragment removed from each piece in a predetermined storage location on the network, and the extraction controller obtains the data of fragment from the predetermined storage location, integrates the group of encrypted pieces obtained from the computer devices and the data of fragment, and restores the original data.

According to this aspect of the present invention, because a portion of data has been removed from each of the encrypted pieces which is to be distributed over the network, an unauthorized party cannot obtain a complete piece of data, even if they are able to successfully decrypt an encrypted piece. This configuration therefore reduces the risk of leakage of data when data is distributed.

DESCRIPTION OF PREFERRED EMBODIMENT

A preferred embodiment of the present invention (hereinafter referred to simply as "the embodiment") will now be described with reference to the drawings.

Figure 1:
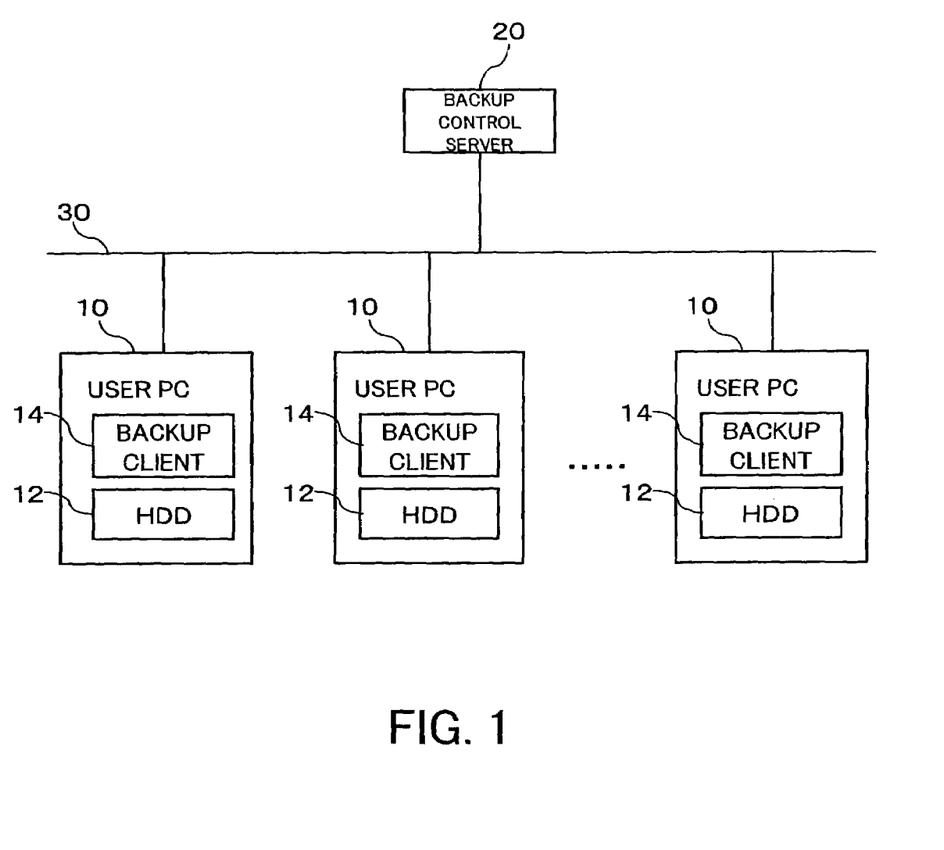
FIG. 1 is a schematic diagram showing a structure of a system according to a preferred embodiment of the present invention.

FIG. 1 is a diagram showing a structure of a file backup system according to an embodiment of the present invention. A system according to this embodiment comprises a plurality of user PCs 10 and a backup control server 20 connected to a LAN 30. Each of the user PCs 10 comprises an HDD (Hard Disk Drive) 12 as a fixed disk device and a backup client software 14 (hereinafter abbreviated to as "BC 14"). Each user PC 10 also has a WOL (Wake On LAN) functionality so that it is possible to switch the power on (power on operation) in response to an external activation instruction input through the LAN 30.

The BC 14 is provided for performing a process for backing up data in the user PC 10. The backup control server 20, in response to a backup request from a BC of a user PC 10, stores a backup of a requested file utilizing available capacity in HDDs 12 of the user PCs 10.

In the system according to the present embodiment, a file to be backed up and stored is divided into a plurality of blocks, segments, or files, collectively referred to herein as "pieces" and is distributively stored in a plurality of user PCs 10. By further applying a concealing process such as encryption to the pieces to be distributively stored in the user PCs 10, the risk of data leakage is reduced.

Figure 2:
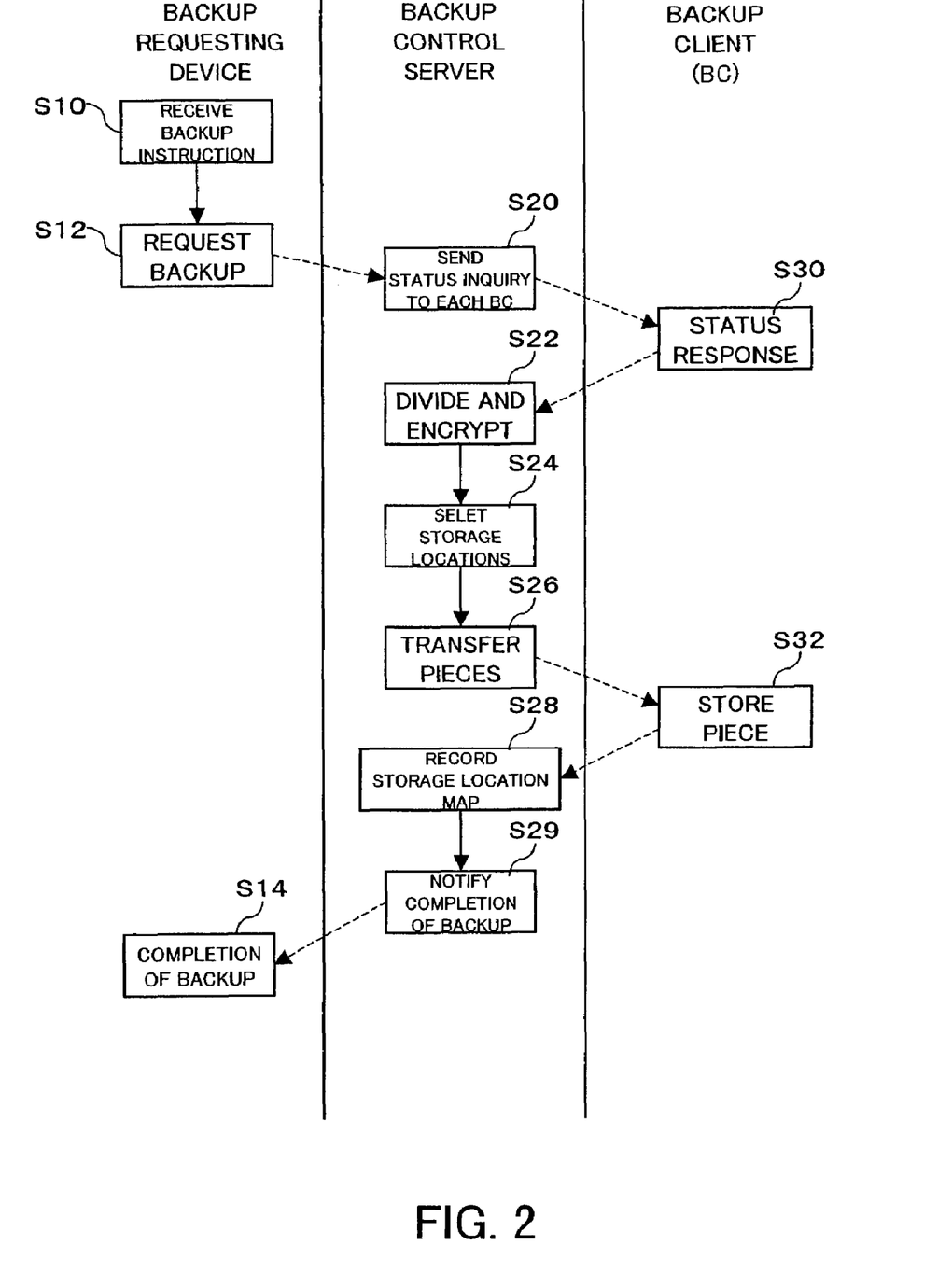
FIG. 2 is a flowchart showing an example procedure of a process for backup.

FIG. 2 is a diagram showing the flow of a distributive backup process in this system. In this process, first, the BC 14 in one of the user PCs 10 receives a backup instruction for a file from a user (S10). The BC 14 sends a backup request to the backup control server 20 (S12). This request includes the actual file to be backed up, or information necessary for accessing the file (for example, path information of location where the file is stored).

The backup control server 20 receives the backup request and sends inquiries to the BCs 14 of the user PCs 10 via the LAN 30 to obtain their status information (S20). In response to this inquiry, the BC 14 of each user PC 10 sends, to the backup control server 20, status information including the available capacity of the HDD 12 of the user PC 10 (S30). Because any user PC 10 in which the power is switched off (OFF) cannot respond to this inquiry, the backup control server 20 can also find the user PCs 10 for which the power has been switched off. The backup control server 20 receives the responses and can now determine which user PCs 10 can be used as a location of distributive storage of the file.

When the statuses of all user PCs 10 on the LAN 30 are notified through the inquiry in step S20, the backup control server 20 applies a division and encryption process (or an encryption and division process) to the file to be backed up (S22). In the division and encryption process, the file to be backed up is converted into a combination of a plurality of encrypted pieces (encrypted pieces) The division and encryption includes a process to first divide data into a plurality of pieces and then encrypting the pieces and a process to first encrypt data and then divide the encrypted data into a plurality of pieces. Both of these processes are referred to herein as "division and encryption".

An example process for the division and encryption will now be described referring to FIG. 3. In this process, the backup control server 20 first compresses the data 100 to be backed up through a predetermined data compression algorithm (S200). Then, the compressed data 105 obtained as the result of the compression is divided into m pieces 110 (m is an integer of at least 2) (P1, P2, . . . Pm) (S202). The number m of the pieces for division may be a fixed value which is determined in advance or may be determined based on information such as the size of the file to be backed up and the number of user PCs 10 which can be utilized as the location for the distributive storage of the file.

Next, a partial data portion 112 is removed from each of the divided pieces 110 (P1, P2, . . . Pm) (a partial data portion 112 cut away in this manner will be referred to as a "fragment" hereinafter) (S204). The fragments 112 removed from the pieces 110 are arranged according to the piece numbers of the pieces from which they were removed, and are collected as fragment data 130.

The backup control server 20 then applies a data compression and encryption process to the pieces 115 (P1', P2', . . . Pm') obtained as a result of the process at step S204 (a remaining portion will be referred to as a "remainder segment" hereinafter) (S206). Encrypted pieces 120 created as a result of this process (P1", P2", . . . Pm") are distributed and stored in the user PCs 10. A compression and encryption process is also applied to the fragment data 130. Encrypted data 135 (Px) obtained as a result of this process is stored in the backup control server 20.

Fixing the location and size of the portion to be removed in step S204 simplifies restoration of the removed segment during a subsequent data extraction process, but such configuration negatively affects security. Therefore, it is sometimes also preferable to change the method of the removal process (for example, the location and size of the portion to be removed) each time a backup process is performed. With such a configuration, the backup control server 20 can record, for each backed up file, the configuration used for the removal process.

When the division and encryption process in step S22 is completed in this manner, the backup control server 20 selects, for each encrypted piece 120, a user PC 10 to be used as a storage location based on the results of the inquiry at step S20 (S24). During this process, the backup control server 20 does not select, as the storage location, any user PC 10 in which power is switched off or any user PC 10 wherein the HDD 12 only has an available capacity which is smaller than the size of the encrypted piece. Which encrypted piece 120 should be stored to which user PC 10 can be determined randomly, for example. It is possible to configure the system so that each of the encrypted pieces 12 is respectively stored in separate user PCs 10, but the present embodiment is not limited to such a configuration. Although it is possible to determine the storage location according to a fixed rule, by randomly determining the storage location as noted above, it is possible to make it difficult for a third party to infer which encrypted piece is stored in which user PC 10. The backup control server 20 transfers, to the BC 14 of the storage location user PC 10 thus determined, the corresponding encrypted piece 120 and instructs the BC 14 to store the encrypted piece (S26). The backup control server 20 also stores in its own disk space the encrypted data 135 for the fragments.

Each BC 14 stores the received encrypted piece 120 in its own HDD12 (S32) and, upon completion of the storage, notifies the backup control server 20 of the completion.

When storage of all encrypted pieces 120 is complete, the backup control server 20 creates and records a storage location map which indicates which encrypted piece of the file to be backed up is stored on which user PC 10 (S28). Then, the backup control server 20 transmits a backup completion notification to the BC 14 which originally requested a backup (S29). Upon receipt of the backup completion notification, the requesting BC 14 displays a message indicating the completion of backup on a screen of the user PC 10 and the backup process is completed (S14).

Figure 4:
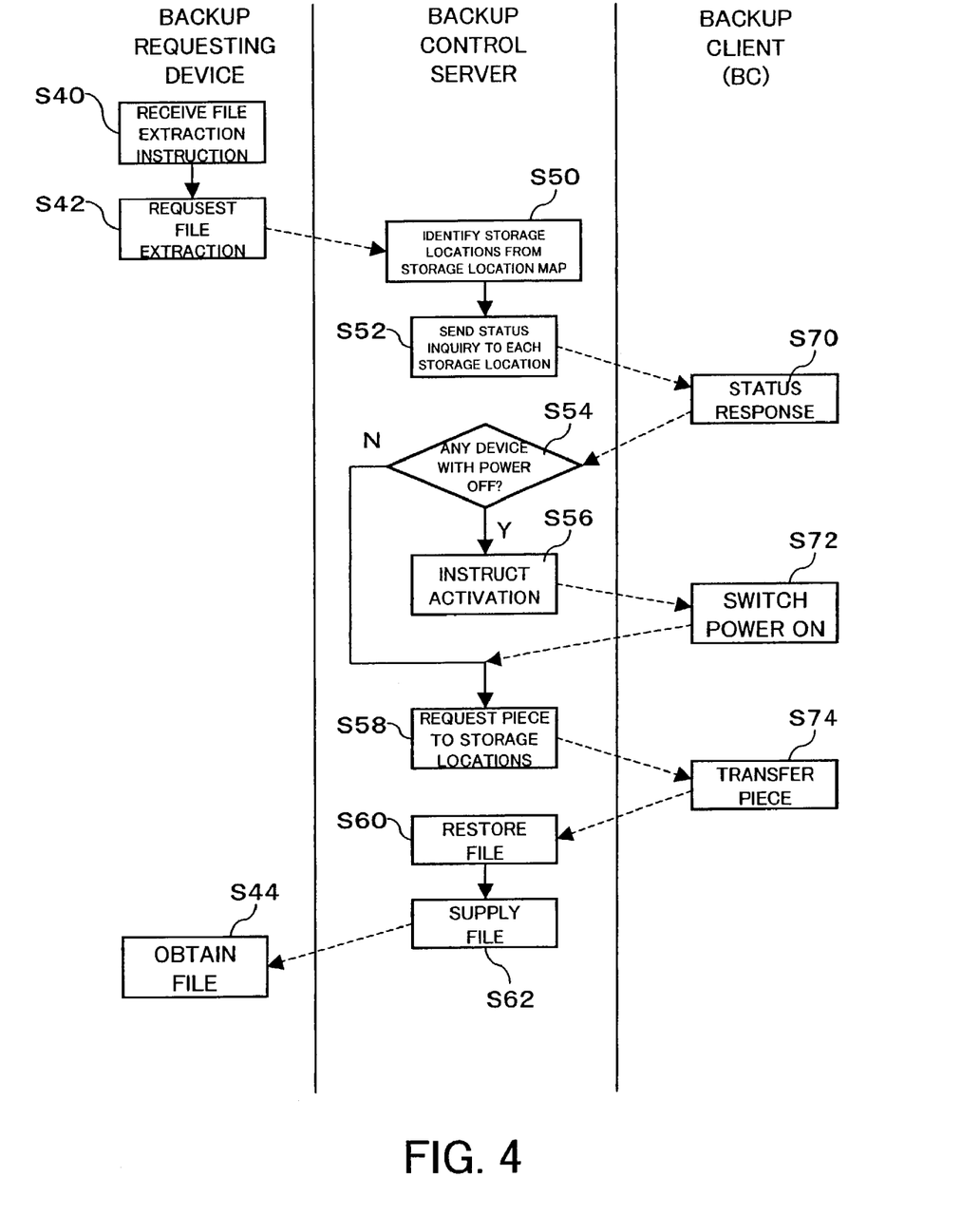
FIG. 4 is a flowchart showing an example procedure of a process for extracting a backed up file.

Next, a process for extracting a file which has been distributively backed up will be described with reference to FIG. 4.

In this process, when the BC 14 in a user PC 10 receives, from a user, an instruction for extracting a backed up file (S40), the BC 14 sends a file extraction request to the backup control server 20 (S42). This request includes, for example, identification information indicating the file to be extracted. Because the BC 14 of each user PC 10 maintains a list of files that have been distributively backed up in response to instructions from the user, it is also possible to employ a configuration wherein, when a file is to be extracted, the BC 14 displays the list on a screen of the user PC 10 and allows the user to select a file for extraction.

The backup control server 20 receives the file extraction request, checks the storage location map corresponding to the file to be extracted, and identifies the BC 14 of the storage location for each encrypted piece of the file (S50). The backup control server 20 then sends inquiries on the status to each storage location via the LAN 30 (S52). Each BC 14 receiving this inquiry sends a response if the device is activated (S70).

The backup control server 20 determines that power is switched off in each storage location which did not return a response (S54) and sends an activation instruction to the corresponding storage locations via the LAN 30 (S56). After a predetermined time has elapsed, the backup control server 20 again sends the status inquiry to the storage location to check activation. In the user PC 10 receiving the activation instructions, power is switched on using the WOL functionality (S72).

The backup control server 20 transmits, to the BCs 14 of the storage locations for which activation is confirmed as described above, a message for requesting the encrypted piece stored in the storage location referring to the storage location map (S58). The BC 14 of the storage location receiving this request transfers the requested encrypted piece to the backup control server 20 (S74).

When the backup control server 20 obtains, from the storage locations, all of the encrypted pieces created from the file to be extracted, the backup control server 20 restores the file to be extracted through an inversion process of the division and encryption based on the group of encrypted pieces and the encrypted data 135 for the fragment data corresponding to the file (S60). Then, the backup control server 20 supplies the restored file to the BC 14 which originally requested extraction of the file (S62). The requesting BC 14 obtains the file and notifies the user of the completion of the file extraction (S44). In this manner, a file which has been distributively backed up can be restored.

With the described processes, a distributive backup can be achieved for a file in response to a request from a user PC 10 which forms a part of the system.

In some cases, as a result of a user PC 10 providing capacity for the distributive backup, the capacity of the user PC 10 may become insufficient for normal file storage desired by the user of that PC. In another example of the present invention, it is also preferable to transfer the encrypted piece stored in the user PC 10 to another user PC 10 in such cases to retain a capacity for file storage. A flow of such process will now be described with reference to FIG. 5.

Figure 5:
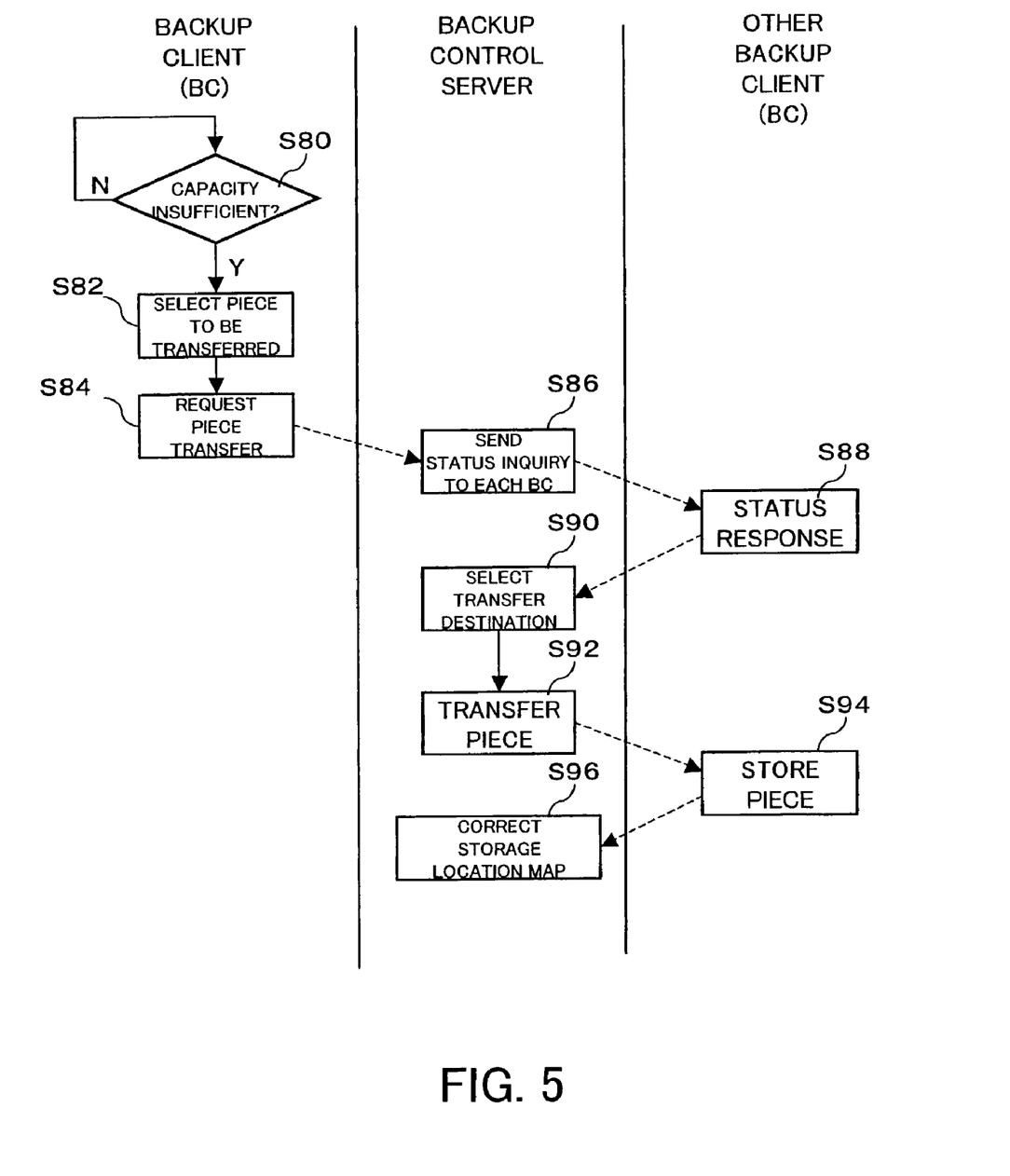
FIG. 5 is a flowchart showing an example process when the capacity of a PC becomes insufficient.

In this example process, the operating system of the user PC 10 continuously monitors the available capacity of the HDD 12 of the PC 10 and determines if instructions by the user and processes by the applications leads to a shortfall in capacity (S80). This determination may alternatively be, for example, a process by the BC 14 to periodically monitor the available capacity of the HDD 12 or to periodically run a program for monitoring the available capacity of the HDD 12, and to determine whether or not the available capacity obtained in such a manner has fallen below a predetermined lower limit. When it is determined as the result of this determination that the capacity is insufficient, the BC 14 of the PC 10 is informed of the capacity that must be released and is requested to release that HDD capacity. The BC 14 receiving this request selects, from among the group of encrypted pieces stored in the HDD 12 managed by the BC 14, encrypted pieces sufficient to satisfy the requested amount to be released (S82). The BC 14 sends a request to the backup control server 20 for transfer of the selected group of pieces (S84). The transfer request may include the data of the encrypted pieces themselves, or information necessary for accessing the data such as, for example, an address. The backup control server 20 receiving this transfer request sends to the other BCs 14 inquiries as to their statuses (S86) and, in response to the inquiries, the BCs 14 return status information such as the available capacity to the backup control server 20 (S88). The control server 20 receives the status response and selects the transfer destination for the encrypted pieces for which transfer has been requested based on the information from the BCs 14 on available capacity or the like (S90). The control server 20 then transfers each encrypted piece to the BC 14 of the corresponding transfer destination (S92). The BC 14 receiving the transfer of the encrypted piece stores the piece in the HDD 12 of the PC 10 (S94) and, when the storing process has been successfully completed, notifies the backup control server 20 of the successful completion of storage. The backup control server 20 receiving this notification corrects the storage location map according to the transfer. In other words, the backup control server 20 updates the storage location map with the BC 14 of the transfer destination of the encrypted piece to be transferred as the new storage location (S96). In this process, the group of transferred encrypted pieces may correspond to a plurality of files in which case the storage location map for each file is corrected.

The structure and operations of the system exemplified in FIG. 1 has been described. According to this system, it is possible to distributively backup a file to available capacity of HDDs 12 of a plurality of user PCs 10 connected to the LAN 30. Because of this, it is possible to backup a file having a size larger than the maximum size that can be backed up in one user PC 10. In addition, with this system, because the pieces to be distributively stored to the user PCs 10 are encrypted, third-party attempts to read the encrypted pieces are less likely to succeed. Moreover, because a portion of each of the encrypted pieces was removed, it is not possible to obtain the full information of the piece, even if the encryption is successfully broken.

In this manner, in the present example of the embodiment, it is possible to securely backup and store a large file by effectively using the available capacity of an individual user PC 10.

Although in the above example configuration all of the user PCs 10 on the LAN 30 provide disk capacity for backup and distributive backup service can be provided for all of the PCs 10, the present invention is not limited to such a configuration. It is also possible, for example, that there is a user PC which does not provide disk capacity and only receives the backup service or a user PC having the opposite characteristics.

Also, although the above-described system is directed to the realization of a distributive backup process by a group of user PCs 10 connected to a LAN 30, the present invention is not limited to such a configuration and may also be applied to a group of computers connected via the Internet.

Figure 6:
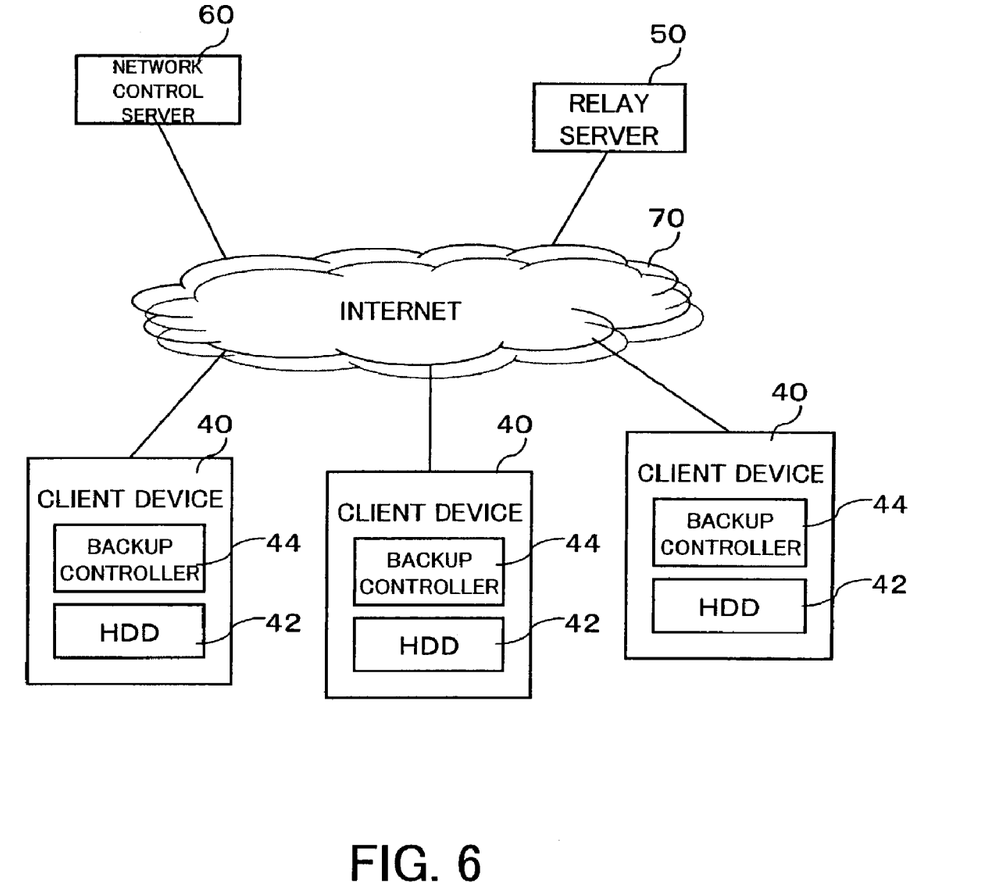
FIG. 6 is a schematic diagram showing a structure of another system according to another preferred embodiment of the present invention.

FIG. 6 shows an example system structure for realizing distributive backup of computers connected via the Internet. In this example structure, a plurality of client devices 40 connected to the Internet 70 provide available capacity of their own HDDs 42 and receive the distributive backup service. A backup controller 44 provided in each client device 40 has both the function of the backup client 14 and the function of the backup control server 20 of the above-described embodiment. In other words, the backup controller 44 has a function to receive a backup instruction from a user, a function for dividing and encrypting a file to be backed up and distributively storing the file on the plurality of client devices 40, and a function for restoring the original file by collecting encrypted pieces distributed among the plurality of client devices 40.

A relay server 50 is a server for providing a relaying location as encrypted pieces are transferred among the client devices 40. As the relay server 50, for example, an ftp (file transfer protocol) server may be used. It is also possible that a plurality of relay servers 50 be made available on the Internet 70. In such a case, the backup controller 44 can suitably select one or more upload destinations from among the plurality of relay servers 50.

A network control server 60 is a server for controlling information relating to each client device 40 and the relay servers 50 in this system, and maintains information such as, for example, address information (for example, IP addresses) of each client device 40 and each relay server 50. The backup controller 44 of each client device 40 periodically accesses the network control server 60 and obtains address information of the other client devices 40 and relay servers 50. In this manner, each client device 40 can maintain information on the most recent system structure and can perform a distributive backup process based on this information.

Figure 7:
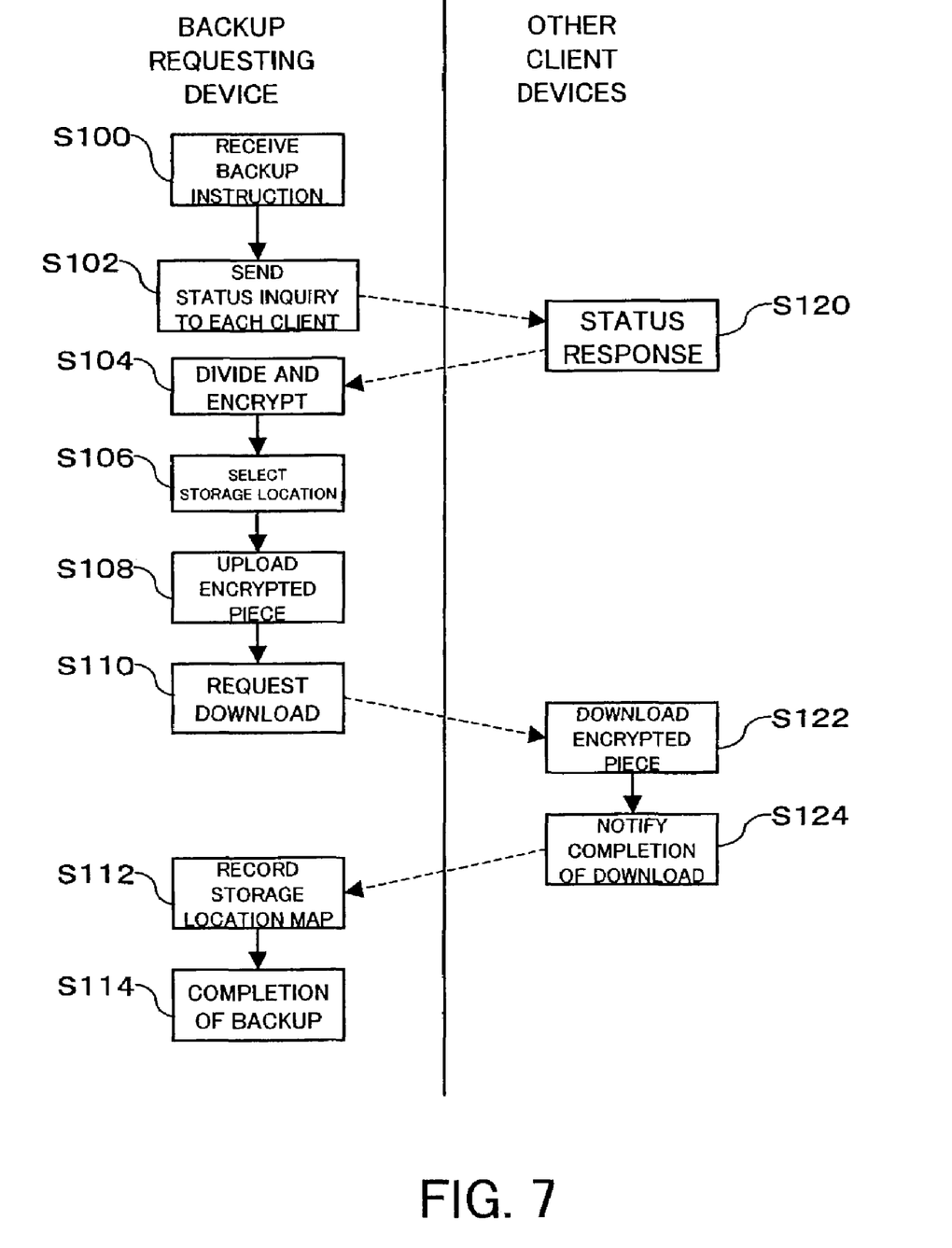
FIG. 7 is a flowchart showing an example procedure of a process for backup.

Referring now to FIG. 7, a flow of the backup proves in the system exemplified in FIG. 6 will be described. In this process, initially, a backup controller 44 in a client device 40 receives a backup instruction for a file from a user (S100). The backup controller 44 sends status inquiries to the other client devices 40 on the Internet 70 (S102). The backup controller 44 of the client device 40 receiving this inquiry respond to the originating device of the inquiry by sending status information of the device including information on the available capacity of its own HDD 42 (S120).

Figure 3:
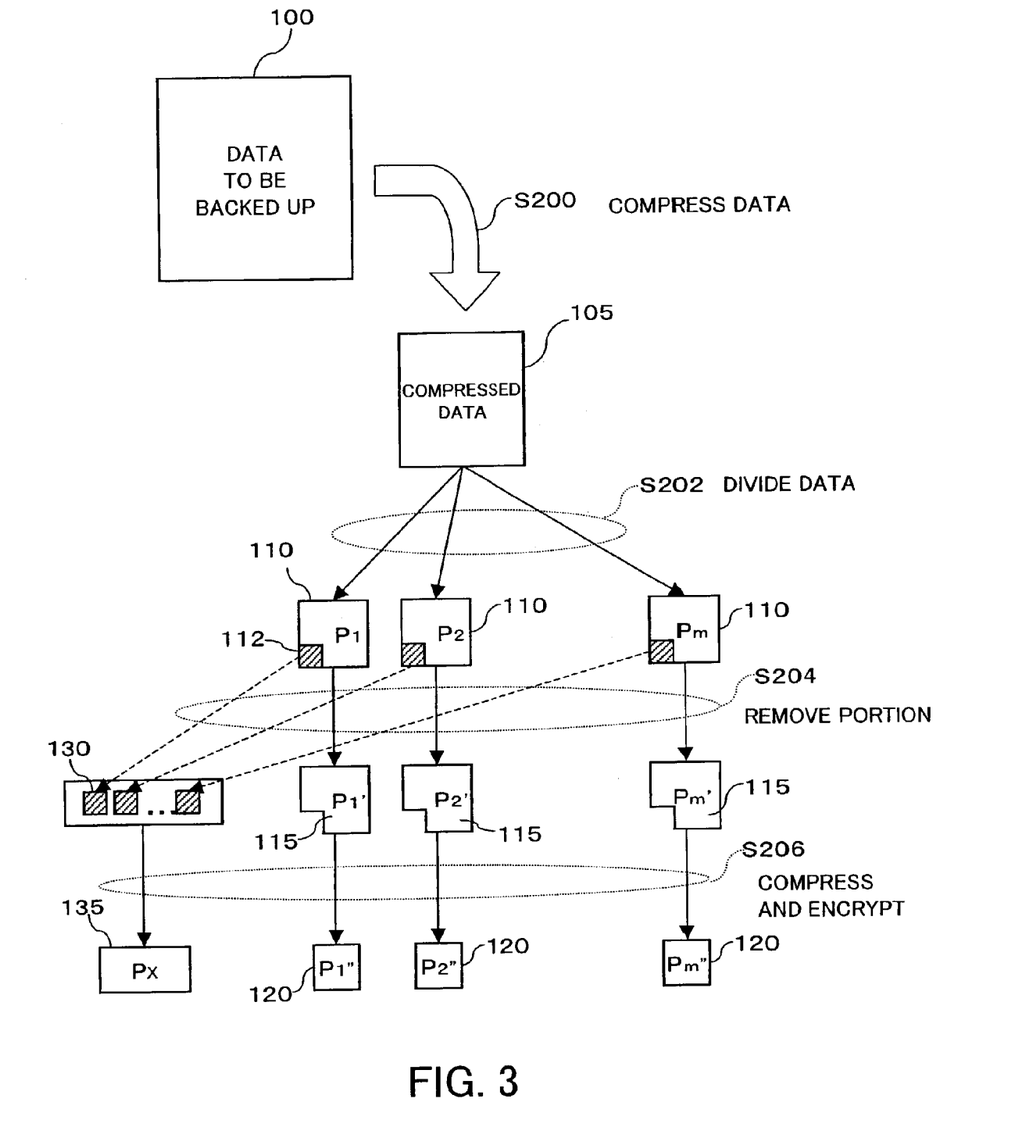
FIG. 3 is a diagram for explaining an example procedure of division and encryption.

The backup controller 44 of the client device 40 requesting backup divides and encrypts the file to be backed up through a method such as, for example, that exemplified in FIG. 3, and creates a plurality of encrypted pieces (S104). During this process, encrypted data 135 obtained by encrypting fragment data 130 is stored in the HDD 42 of the device 40. Here, by additionally storing the encrypted data 135 in a separate device on the Internet 70 such as the network control server 60, it is possible to restore the file even when the encrypted data 135 stored in the client device 40 which requested backup cannot be used.

Then, the backup controller 44 of the backup requesting device 40 selects a storage location for each encrypted piece based on the response from each of the other client devices 40 for the inquiry of step S102 (S106). The backup controller 44 then uploads each encrypted piece to the relay server 50 (S108) and sends a download request to the storage location corresponding to the encrypted piece (S110). The download request includes information for accessing the uploaded encrypted piece (for example, the URL of the encrypted piece). The steps S108 and S110 are performed for all of the encrypted pieces.

The backup controller 44 of the client device 40 receiving the download request downloads the encrypted piece from the relay server 50 according to the request (S122). When the download is completed, the backup controller 44 transmits a notification of completion of downloading to the client device 40 from which the backup request originates (S124).

The backup controller 44 of the backup requesting device creates and stores a storage location map which indicates to which client device 40 each encrypted piece of the file to be backed up is stored (S112). With this process, the sequence of the distributive backup process is completed (S114).

Figure 8:
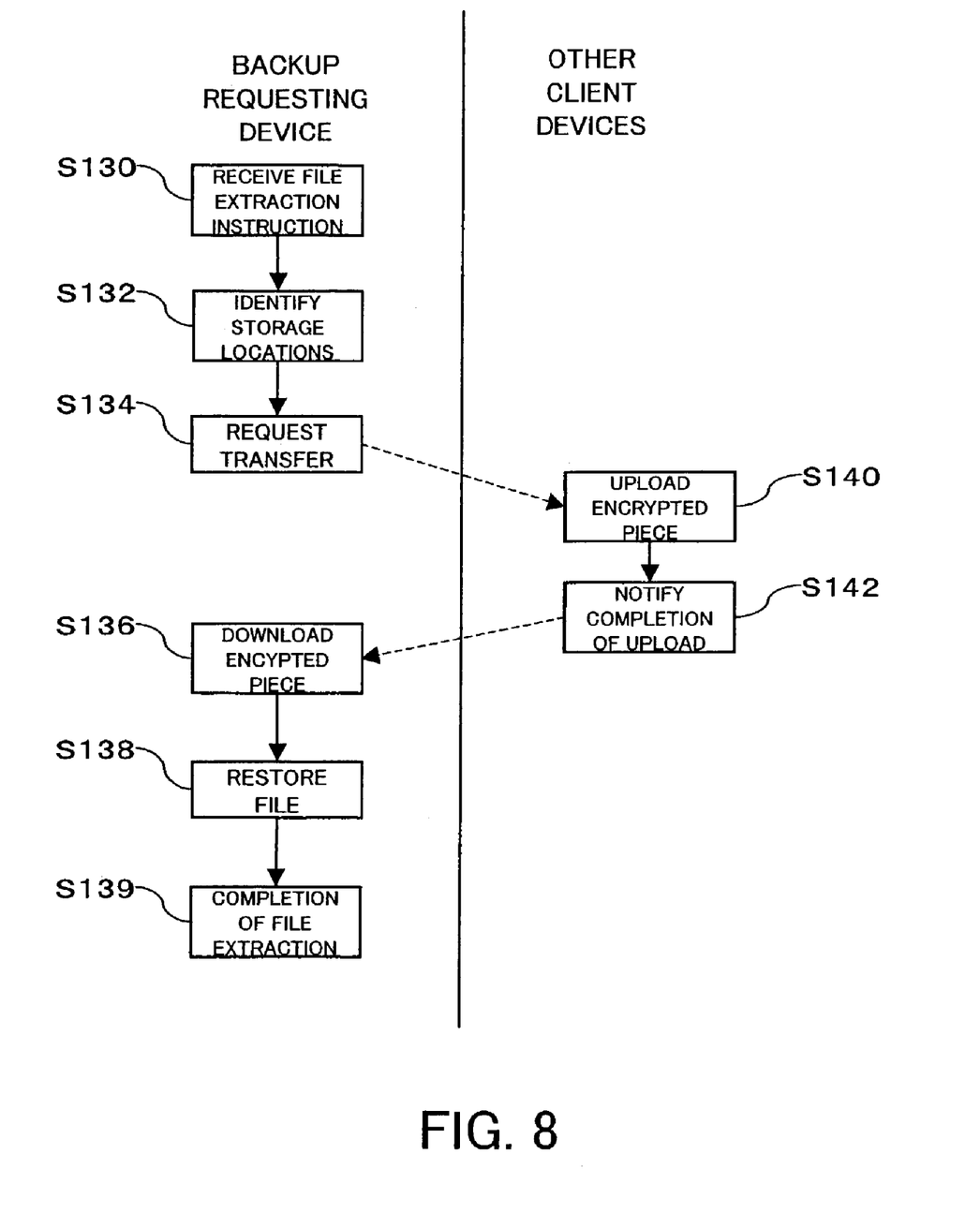
FIG. 8 is a flowchart showing an example procedure of a process for extracting a backed up file.

Next, referring to FIG. 8, a process for extracting the file which has been distributively backed up through the above-described process will be described. A backup controller 44 of a client device 40 maintains a list of files backed up from that device 40, and a user can input an extraction instruction designating a file in that list. A backup controller 44 receiving this instruction (S130) identifies the storage location of each encrypted piece from a storage location map corresponding to the file (S132). Then, the backup controller 44 sends, to each storage location, a request to transfer the encrypted piece (S134). The backup controller 44 of the client device 40 receiving the transfer request uploads the requested encrypted piece to a relay server 50 (S140) and sends a notification of completion of uploading which includes information for accessing the encrypted piece to the requesting client device 40 (S142). The client device 40 receiving this completion notification accesses the relay server 50 and downloads the encrypted piece related to the notification (S136). After all of the encrypted pieces of the file to be extracted are obtained in this manner, the backup controller 44 restores the original file by executing an inversion process of the division and encryption process based on the fragment data and the obtained encrypted pieces (S138). With this process, the file extraction is completed (S139).

A structure for distributive backup of a file among a plurality of client devices 40 via the Internet 70 has been described. With this configuration, in addition to the advantages similar to those in the system of FIG. 1 as described above, an advantage can be obtained that, because the encrypted pieces are actively uploaded to and downloaded from the relay server 50 by the sender and the receiver when the encrypted piece is transferred, the client devices 40 do not need to always open, to the Internet, a port for receiving data, resulting in strong security against intrusion from outside.

Although in the example structure shown in FIG. 6 each client device 40 functions as the backup control server 20 in the structure exemplified in FIG. 1, the present invention is not limited to such a configuration, and, even in a system structure via the Internet 70, it is possible to employ a client-server structure similar to the backup control server 20 shown in FIG. 1.

As an alternative example of the system described above, it is preferable to employ a configuration wherein the encrypted pieces are redundantly distributed among client devices 40 located in geographically different locations to redundantly store the pieces. This structure enables restoration of a file even when a client device 40 in one location becomes unusable because of, for example, an accident in that location.

In this alternative example of the embodiment, the backup controller 44 of each client device 40 is provided with information on the physical locations of the other client devices 40. The information on physical locations may be the address of the building in which the client device 40 is placed or information obtained by assigning a code to the address. It is also preferable to register the physical location information of the client devices 40 in the network control server 60, and to allow the client devices 40 to obtain the information as necessary. During the distributive backup process, for example, the backup controller 44 may redundantly store each encrypted piece on a plurality of client devices 40 in different physical locations. With such a structure, even when any one of the client devices 40 becomes unusable, the same encrypted piece can be obtained from another client device 40. In addition, as another method, during when a file is divided and encrypted, parity data (for example, bit-by-bit parity data) may be generated for the group of encrypted pieces and the parity data and the encrypted pieces may be stored in client devices 40 in different physical locations. With such a structure, even when one of the client devices 40 becomes unusable, the original file can be restored from information stored in the other client devices 40.

As another alternative example, it is possible to construct a large distributive backup system made of a plurality of LAN-based systems as shown in FIG. 1 connected via the Internet. In this example, the backup control server 20 of the system of FIG. 1 is connected to the Internet. Each backup control server 20 receives a backup request from user PCs in its own domain, divides and encrypts the file to be backed up, and distributes a group of encrypted pieces obtained in such a manner not only in its own domain, but also to the other domains via the Internet. In this case, it is also preferable to allow the user to designate the range over which the group of encrypted pieces is to be distributed. In this case, the user can designate the range of distribution of the group of encrypted pieces according to their circumstances or wishes so as to limit the range to his own domain or to broaden the range to additional domains. A backup control server 20 receiving an encrypted piece from another domain either stores the encrypted piece in the HDD of its own device or in the HDD of a user PC within the domain to which the backup control server 20 belongs. When the distributively backed up file is to be restored from encrypted pieces distributed via the Internet, a backup control server 20 can request the encrypted piece from a backup control server 20 at the distribution destination. The server 20 receiving this request extracts the requested encrypted piece from the user PC in its own domain or from its own device, and supplies the piece to the requesting server 20.

In the above, examples have been described wherein an entire file is distributively backed up. The present invention is not, however, limited to such a configuration and a part of a file may be backed up with similar structures. For example, if the data to be backed up is animation data and the entirety of the file of the animation data is distributively backed up through the methods described above, a great deal of time may be require to reconstruct the original animation data if the animation data is replayed from the distributively backed up data, possibly resulting in undesirable delay in the replaying process. Therefore, it may be preferable to store, on the user PC 10 requesting the backup, data corresponding to a predetermined time period from the beginning of the animation data and to distributively backup the remaining portion of the animation data through the methods described above. More specifically, in this configuration, a program which provides a virtual file API (Application Program Interface) for accessing the animation data file is installed to the user PC 10 and resides in the user PC 10. When writing of an animation data file is requested to this virtual file API, the file API stores, to the user PC 10, a portion of the animation data to be written corresponding to a predetermined time period from the beginning and requests a distributive backup of the remaining portion to the backup client 14. In response to such a request, the backup client 14 request distributive backup of the remaining portion to the backup control server 30 which performs the distributive backup process as described above. On the other hand, when reading of the file is requested from an animation replaying application or the like, the API provides the data stored within the user PC 10 and corresponding to the predetermined time period from the beginning of the file as stream data and requests restoration of the backup of the remaining portion of the file to the backup client 14. In this manner, the backup client 14 collects the group of distributively backed up encrypted pieces and reconstructs the remaining animation data while the application is replaying the animation data corresponding to the predetermined time period from the beginning which has been stored in the user PC 10. Then, the file API connects without gaps the animation data reconstructed by the backup client 14 to the animation data of the predetermined time period from the beginning, as described above, and provides the data as stream data to the animation replaying application. In this manner, the animation replaying application can continuously replay the entirety of the original animation data. With this configuration, because the animation replaying application must only write and read a file through the file API and need not perform any additional processes, existing applications may be used without significant modification. Further, with this configuration, it is possible to replay animation without a time lag before the start of the replay of animation, even when only the beginning section of animation data having an enormous size is stored in the user PC 10 and the remaining portion is stored on the network.

The preferred embodiment of the present invention has been described. It should be understood that the examples used to illustrate the embodiment are for the purpose of exemplifying only, and are not intended to limit the present invention in any way. For example, although a system for backing up a file is described above, it would be apparent to a person with ordinary skill in the art that the present invention may also be applied to general storage of a file.

What is claimed is:

1. A distributive storage controller for providing a data storage service to a plurality of computer devices connected to a network, the controller comprising:
    (a) a storage controller that
        (1) receives a storage instruction of data to be stored from one of a plurality of connected computer devices,
        (2) checks an available data storage capacity of a storage unit of each of the computer devices,
        (3) divides and encrypts the data to be stored into a plurality of encrypted pieces, wherein during the division and encryption, the storage controller
            (i) removes a portion of each divided piece of data,
            (ii) generates the encrypted pieces from the segment remaining after the removal,
            (iii) stores each removed portion to a predetermined storage location on the network,
        (4) selects, for each of the plurality of encrypted pieces, one of the computer devices in which the storage unit has available data storage capacity for storing that encrypted piece based on the result of the checking,
        (5) transfers and stores each encrypted piece to the computer device selected for storing that encrypted piece, and
        (6) generates storage location information indicating which encrypted piece is stored in which computer device; and
    (b) an extraction controller that
        (1) receives an extraction instruction of stored data from one of the plurality of connected computer devices,
        (2) identifies each computer device to which each encrypted piece of the stored data is stored referring to the storage location information, (3) retrieves and decrypts each encrypted piece from the computer device in which the encrypted piece is stored, wherein during the retrieval, the extraction controller
  (i) retrieves the removed portions from the predetermined storage location,
  (ii) decrypts and integrates the group of encrypted pieces obtained from the computer devices with the removed portions from the predetermined storage locations,
  (iii) restores the original data,
(4) restores the original data based on the retrieved and decrypted pieces, and
(5) provides the restored original data to the one of the plurality of connected computer devices instructing the extraction.

2. The distributive storage controller according to claim 1, wherein the storage controller has location information indicating the physical location of each of the computer devices and selects the computer devices as storage locations of each of the encrypted pieces based on the location information in such a manner that the storage locations are physically separated.

3. The distributive storage controller according to claim 1, wherein the storage controller
  (1) receives a request to transfer a stored encrypted piece from the computer device in which the encrypted piece is stored,
  (2) checks the available data storage capacity of the storage units of other computer devices,
  (3) selects one of the other computer devices as a transfer destination for the encrypted piece based on the result of the checking,
  (4) transfers the encrypted piece from the computer device in which the encrypted piece is stored to the selected transfer destination computer device, and
  (5) corrects the storage location information of the encrypted piece according to the transfer.

4. The distributive storage controller according to claim 1, wherein the distributive storage controller is incorporated into one of the plurality of computer devices.

5. The distributive storage controller according to claim 4, further comprising:
  (a) a local storage controller that
    (1) receives a storage instruction of a file from a program executed on the computer device into which the distributive storage controller is incorporated,
    (2) stores a predetermined portion of the file to the storage unit of the computer device into which the distributive storage controller is incorporated, and
    (3) issues a storage instruction for the remaining portion as the data to be stored by the storage controller; and
  (b) a local extraction controller that
    (1) receives a read instruction of a file which has been stored by the local storage controller from a program executed on the computer device into which the distributive storage controller is incorporated,
    (2) reads the predetermined portion of the file from the storage unit of the computer device into which the distributive controller is incorporated,
    (3) supplies the read portion to the program,
    (4) issues an extraction instruction for the stored data corresponding to the remaining portion to the extraction controller, and
    (5) supplies the stored data restored by the extraction controller in response to the extraction instruction to the program.

6. The distributive storage controller according to claim 5, wherein, while the local extraction controller is reading the predetermined portion from the storage unit and supplying the portion to the program, the extraction controller restores the stored data corresponding to the remaining portion.

7. A computer device connected to a network, the computer device comprising:
  a response module for returning a response including information on available data storage capacity of a storage unit of the computer device in response to a status inquiry received from a requesting device via the network,
    the storage unit storing data transmitted from the requesting device via the network to the computer device;
  a data provider which, in response to a data extraction request sent from the requesting device via the network, reads data related to the extraction request from the storage unit and transmits the data to the requesting device;
  a storage monitor for monitoring the available capacity of the storage unit, determining whether or not the available capacity is sufficient to store an encrypted piece of data, and issuing a transfer request for the stored encrypted piece to the requesting device when determining that the available capacity of the storage unit is insufficient; and
  a storage controller that divides and encrypts the data to be stored into a plurality of encrypted pieces, wherein, during the division and encryption, the storage controller
    (1) removes a portion of each divided piece of data,
    (2) generates the encrypted pieces from the segment remaining after the removal, and
    (3) stores each removed portion to a predetermined storage location on the network; and
  an extraction controller that retrieves the removed portions from the predetermined storage location, wherein during the retrieval, the extraction controller
    (1) retrieves the removed portions from the predetermined storage location,
    (2) decrypts and integrates the group of encrypted pieces obtained from the computer devices with the removed portions from the predetermined storage locations, and
    (3) restores the original data.

8. A distributive storage system comprising:
  a plurality of computer devices connected to a network, each computer device including a storage unit that has a predetermined data storage capacity;
  (a) a storage controller which is connected to the network and which, upon receiving a storage instruction of data from a client device
    (1) checks an available data storage of the predetermined data storage capacity of the storage unit of each of the computer devices,
    (2) divides and encrypts the data into a plurality of encrypted pieces,
    (3) removes a portion of each divided piece of data,
    (4) generates the encrypted pieces from the segment remaining after the removal, and
    (5) stores each removed portion to a predetermined storage location on the network;

(6) selects, for each encrypted piece, a computer device having the available data storage capacity for storing that encrypted piece from among the plurality of computer devices based on the result of the checking,
(7) transfers and stores each of the encrypted pieces to the selected corresponding computer device, and
(8) generates storage location information indicating which encrypted piece is stored in which computer device; and (b) an extraction controller which is connected to the network and which, upon receiving an extraction instruction of data from a client device,
  (1) identifies computer devices to which the encrypted pieces of the data are stored by referring to the storage location information,
  (2) obtains each encrypted piece from the corresponding computer device,
  (3) retrieves the removed portions from the predetermined storage location,
  (4) decrypts and integrates the group of encrypted pieces obtained from the computer devices with the removed portions from the predetermined storage locations,
  (5) restores the original data based on the encrypted pieces, and
  (6) supplies the restored data to the client device.

9. The system according to claim 8, wherein:
each of the computer devices comprises a power supply controller for supplying power to the computer device in response to an activation instruction via the network; and
the extraction controller comprises an activation controller for transmitting an activation instruction, when there is a computer device in which the power is switched off from among the computer devices identified from the storage location information, to the power supply controller of each of the computer devices in which the power is switched off.

10. The system according to claim 8, wherein:
the computer device monitors the available capacity of the storage unit, determines whether or not the available capacity is sufficient, and, when determining that the available capacity is insufficient, issues a transfer request for the stored encrypted piece to the storage controller; and
the storage controller, upon receiving a transfer request of the encrypted piece from the computer device, checks the status of the storage device of each of the other computer devices, selects a computer device as a transfer destination to which the piece is to be stored from among the other computer devices based on the results of the checking process, transfers the encrypted piece from the computer device issuing the transfer request to the transfer destination computer device, and corrects the storage location information of the data corresponding to the encrypted piece according to the transfer.

11. The system according to claim 8, wherein:
the storage controller and the extraction controller are incorporated into at least one of the plurality of computer devices.

12. A method for controlling a distributive storage which provides a data storage service to a plurality of computer devices connected to a network, each computer device including a storage unit that has a predetermined data storage capacity, the method comprising:

(a) upon reception of a storage instruction of data,
  (1) checking an available data storage of the predetermined data storage capacity of the storage unit of each of the computer devices,
  (2) dividing and encrypting the data into a plurality of encrypted pieces,
  (3) removing a portion of each divided piece of data,
  (4) generating the encrypted pieces from the segment remaining after the removal,
  (5) storing each removed portion to a predetermined storage location on the network;
  (6) selecting, for each encrypted piece, a computer device having the available data storage capacity for storing the selected encrypted piece from among the plurality of computer devices based on the result of the checking process,
  (7) transferring and storing each encrypted piece to the selected corresponding computer device, and
  (8) generating storage location information indicating which encrypted piece is stored in which computer device; and (b) upon reception of an extraction instruction of data,
  (1) identifying computer devices to which the encrypted pieces corresponding to the data are stored by referring to the storage location information,
  (2) retrieving the removed portions from each of the computer devices,
  (3) decrypting and integrating the group of encrypted pieces obtained from the computer devices with the removed portions from the predetermined storage locations, and
  (4) restoring the original data based on the encrypted pieces.

13. The method according to claim 12, wherein:
(a) comprises, in the dividing and encrypting process, removing a portion of each piece obtained by dividing the data, generating the encrypted pieces from the segments remaining after the removal process, and storing data of the fragments removed from the pieces to a predetermined storage location on the network, and
(b) comprises obtaining the data of the fragments from the predetermined storage location and restoring the original data after integrating the group of encrypted pieces obtained from the computer devices and the data of the fragments.

14. The method according to claim 12, wherein
(a) comprises selecting, based on location information indicating the physical locations of the computer devices, computer devices as the storage locations for the encrypted pieces so that the storage destination computer devices are physically separated.

15. A method according to claim 12, further comprising:
upon receiving a transfer request for the encrypted piece from any of the computer devices,
  checking the status of the storage device of each of the other computer devices,
  selecting one computer device as a transfer destination to which the piece is to be stored from among the other computer devices based on the result of the checking process,
  transferring the encrypted piece from the computer device issuing the transfer request to the transfer destination computer device, and
  correcting the storage location information for the data corresponding to the encrypted piece according to the transfer.

16. A method for controlling a computer device which is connected to a network and provided for a distributive storage service of data, the method comprising:
- returning a response including information of an available data storage capacity of a storage device in the computer device in response to a status inquiry sent from a requesting device via the network;
- storing data transmitted from the requesting device via the network to the storage device, wherein
  - (a) during the division and encryption, the storage controller
    - (1) removes a portion of each divided piece of data,
    - (2) generates the encrypted pieces from the segment remaining after the removal, and
    - (3) stores each removed portion to a predetermined storage location on the network; and
  - in response to a data extraction request sent from the requesting device via the network, reading the data related to the extraction request from the storage device and transmitting the data to the requesting device, wherein
  - (b) during the retrieval, the extraction controller
    - (1) retrieves the removed portions from the predetermined storage location,
    - (2) decrypts and integrates the group of encrypted pieces obtained from the computer devices with the removed portions from the predetermined storage locations, and
    - (3) restores the original data.

17. The method according to claim 16, further comprising:
- monitoring the available capacity of the storage unit, determining whether or not the available capacity is sufficient, and, upon determining that available capacity of the storage unit is insufficient, issuing a transfer request of the stored encrypted piece to the requesting device.

18. A method for controlling a distributive storage system including a plurality of computer devices, a storage controller, and an extraction controller all of which are connected to a network, each of the plurality of computer devices including a storage unit that has a predetermined data storage capacity, the method comprising:
- (a) when the storage controller receives a storage instruction of data from a client device,
  - (1) checking an available data storage of the predetermined data storage capacity of the storage unit of each of the computer devices,
  - (2) dividing and encrypting the data into a plurality of pieces,
  - (3) removing a portion of each divided piece of data,
  - (4) generating the encrypted pieces from the segment remaining after the removal,
  - (5) selecting, for each removed portion, a computer device having the available data storage capacity for storing that removed portion from among the plurality of computer devices based on the result of the checking process,
  - (6) transferring and storing each removed portion to the selected corresponding computer device, and
  - (7) generating storage location information indicating which removed portion is stored in which computer device; and
- (b) when the extraction controller receives an extraction instruction of data from a client device,
  - (1) identifying computer devices to which the encrypted pieces corresponding to the data are stored by referring to the storage location information,
  - (2) obtaining each of the removed portions from each computer device,
  - (3) decrypts and integrates the group of encrypted pieces obtained from the computer devices with the removed portions from the predetermined storage locations,
  - (4) restores the original data,
  - (5) supplying the restored data to the client device.

19. The method according to claim 18, wherein:
- when it is determined that the power of any of the computer devices from among the computer devices identified from the storage location information is switched off, the extraction controller transmits an activation instruction to the computer device.

20. The method according to claim 18, wherein:
- the computer device monitors the available capacity of the storage device, determines whether or not the available capacity is sufficient, and upon determining that the available capacity of the storage unit is insufficient, issues a transfer request for the stored encrypted piece to the storage controller;
- the storage controller, upon receiving the transfer request for the encrypted piece from the computer device, checks the status of the storage unit of each of the other computer devices, selects a computer device as a transfer destination to which the piece is to be stored from among the other computer devices based on the result of the checking process, transfers the encrypted piece from the computer device issuing the transfer request to the transfer destination computer device, and corrects the storage location information of the data corresponding to the encrypted piece according to the transfer.

21. A computer readable recording medium which records a program which, when executed, causes a computer system connected to a network to execute:
- (a) controlling a storage when receiving a storage instruction of data, to
  - (1) check an available data storage of a predetermined data storage capacity of a storage unit of each of a predetermined plurality of computer devices on the network,
  - (2) divide and encrypt the data into a plurality of encrypted pieces,
  - (3) remove a portion of each divided piece of data,
  - (4) generate the encrypted pieces from the segment remaining after the removal, and
  - (5) stores each removed portion to a predetermined storage location on the network; and
  - (6) select, for each encrypted piece, a computer device having the available data storage of the predetermined data storage capacity for storing that encrypted piece from among the plurality of computer devices based on the result of the checking process,
  - (7) transfer and store the encrypted piece to the selected corresponding computer device, and
  - (8) generate storage location information indicating which encrypted piece is stored to which computer device; and
- (b) controlling an extraction when receiving an extraction instruction for data, to
  - (1) identify computer devices to which the encrypted pieces for the data are stored by referring to the storage location information, (2) obtain the encrypted pieces from the computer devices,
(3) retrieves the removed portions from the predetermined storage location,
(4) decrypts and integrates the group of encrypted pieces obtained from the computer devices with the removed portions from the predetermined storage locations,
(5) restore the original data based on the encrypted pieces.

22. A computer readable recording medium which records a program which, when executed, causes a computer system connected to a network to execute:

returning a response including information on the available data storage capacity of a storage unit within its own device in response to a status inquiry sent from a requesting device via the network;

dividing and encrypting data, comprising:
(1) removing a portion of each divided piece of data,
(2) generating the encrypted pieces from the segment remaining after the removal, and
(3) storing each removed portion to a predetermined storage location on the network; and storing data transmitted from the requesting device via the network to the storage unit;

in response to an extraction request of data sent from the requesting device via the network, reading the data related to the extraction request from the storage unit and transmitting the data to the requesting device, retrieving the data, comprising:
(1) retrieving the removed portions from the predetermined storage location,
(2) decrypting and integrating the group of encrypted pieces obtained from the computer devices with the removed portions from the predetermined storage locations, and
(3) restoring the original data.

* * * * *